US010064145B2

(12) United States Patent
Kim et al.

(10) Patent No.: US 10,064,145 B2
(45) Date of Patent: Aug. 28, 2018

(54) METHOD OF RECEIVING DOWNLINK SIGNAL OF HIGH SPEED MOVING TERMINAL, ADAPTIVE COMMUNICATION METHOD AND ADAPTIVE COMMUNICATION APPARATUS IN MOBILE WIRELESS BACKHAUL NETWORK

(71) Applicant: Electronics and Telecommunications Research Institute, Daejeon (KR)

(72) Inventors: Junhyeong Kim, Daejeon (KR); Sungwoo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 124 days.

(21) Appl. No.: 15/006,362

(22) Filed: Jan. 26, 2016

(65) Prior Publication Data

US 2016/0219539 A1 Jul. 28, 2016

(30) Foreign Application Priority Data

Jan. 26, 2015 (KR) .................. 10-2015-0012277
Jan. 26, 2015 (KR) .................. 10-2015-0012278

(Continued)

(51) Int. Cl.
*G08C 17/00* (2006.01)
*H04W 56/00* (2009.01)
*H04W 52/02* (2009.01)

(52) U.S. Cl.
CPC ..... *H04W 56/001* (2013.01); *H04W 52/0206* (2013.01); *Y02D 70/00* (2018.01); *Y02D 70/142* (2018.01); *Y02D 70/164* (2018.01)

(58) Field of Classification Search
None
See application file for complete search history.

(56) References Cited

U.S. PATENT DOCUMENTS

| 2001/0006515 A1* | 7/2001 | Lee | H04W 36/0083 |
| | | | 370/331 |
| 2007/0021122 A1* | 1/2007 | Lane | H04B 7/01 |
| | | | 455/441 |

(Continued)

FOREIGN PATENT DOCUMENTS

| KR | 100785785 B1 | 12/2007 |
| KR | 1020090059728 A | 6/2009 |

(Continued)

*Primary Examiner* — Phirin Sam
(74) *Attorney, Agent, or Firm* — William Park & Associates Ltd.

(57) ABSTRACT

Disclosed herein is an adaptive communication method of a base station in a moving wireless backhaul network, including: acquiring frame transmitting/receiving timings of a terminal; periodically searching for a terminal synchronous signal transmitted from the terminal; if the terminal synchronous signal is detected, estimating the frame transmitting/receiving timings of the base station to/from the terminal based on the terminal synchronous signal and the frame transmitting/receiving timings of the terminal; and transmitting the base station synchronous signal to the terminal based on the frame transmitting/receiving timings of the base station.

14 Claims, 11 Drawing Sheets

(30) Foreign Application Priority Data

Jan. 20, 2016 (KR) ........................ 10-2016-0007247
Jan. 20, 2016 (KR) ........................ 10-2016-0007250

(56) References Cited

U.S. PATENT DOCUMENTS

| | | | |
|---|---|---|---|
| 2008/0198763 A1* | 8/2008 | Fischer | H04W 8/245 |
| | | | 370/254 |
| 2008/0225770 A1 | 9/2008 | Cho et al. | |
| 2009/0004971 A1* | 1/2009 | Dateki | H04L 5/0048 |
| | | | 455/62 |
| 2009/0075701 A1 | 3/2009 | Haskell et al. | |
| 2010/0056165 A1 | 3/2010 | Kim et al. | |
| 2010/0061305 A1* | 3/2010 | Kubo | H04W 52/0216 |
| | | | 370/328 |
| 2010/0259443 A1 | 10/2010 | Kwak et al. | |
| 2011/0194407 A1* | 8/2011 | Ji | H04B 7/2606 |
| | | | 370/226 |
| 2011/0230197 A1 | 9/2011 | Wu et al. | |
| 2012/0163305 A1* | 6/2012 | Nimbalker | H04W 52/0206 |
| | | | 370/329 |
| 2012/0176975 A1* | 7/2012 | Choi | H04W 48/12 |
| | | | 370/329 |
| 2013/0163484 A1 | 6/2013 | Ihm et al. | |
| 2013/0189932 A1* | 7/2013 | Shen | H04W 52/0232 |
| | | | 455/68 |
| 2014/0194126 A1* | 7/2014 | Tsuboi | H04W 36/0072 |
| | | | 455/437 |
| 2014/0274064 A1 | 9/2014 | Al-Shalash et al. | |
| 2014/0323139 A1 | 10/2014 | Lee et al. | |
| 2015/0057018 A1* | 2/2015 | Moeglein | G01S 5/0036 |
| | | | 455/456.1 |
| 2015/0124895 A1 | 5/2015 | Park et al. | |
| 2015/0126217 A1* | 5/2015 | Do | G01S 5/0252 |
| | | | 455/456.1 |
| 2015/0171940 A1 | 6/2015 | Park et al. | |
| 2016/0105860 A1* | 4/2016 | Li | H04W 4/005 |
| | | | 370/350 |
| 2016/0131733 A1* | 5/2016 | Do | G01S 5/0226 |
| | | | 342/378 |
| 2016/0143065 A1* | 5/2016 | Gupta | H04W 4/90 |
| | | | 455/404.2 |
| 2017/0074972 A1* | 3/2017 | Do | G01S 5/0252 |
| 2017/0078935 A1* | 3/2017 | Hahn | H04W 36/0077 |

FOREIGN PATENT DOCUMENTS

| | | |
|---|---|---|
| KR | 1020100024770 A | 3/2010 |
| KR | 1020110033030 A | 3/2011 |
| KR | 1020140127054 A | 11/2014 |
| KR | 1020150029639 A | 3/2015 |

\* cited by examiner

METHOD OF RECEIVING DOWNLINK SIGNAL OF HIGH SPEED MOVING TERMINAL, ADAPTIVE COMMUNICATION METHOD AND ADAPTIVE COMMUNICATION APPARATUS IN MOBILE WIRELESS BACKHAUL NETWORK

CROSS-REFERENCE TO RELATED APPLICATION

This application claims priority to and the benefit of Korean Patent Application Nos. 10-2015-0012277, 10-2015-0012278, 10-2016-0007250 and 10-2016-0007247 filed with the Korean Intellectual Property Office on Jan. 26, 2015, Jan. 26, 2015, Jan. 20, 2016 and Jan. 20, 2016, the entire contents of which are incorporated herein by reference.

BACKGROUND (a) Field of the Invention

An exemplary embodiment of the present invention relates to a method of receiving a downlink signal and an adaptive communication method and an adaptive communication apparatus, in a mobile wireless backhaul network.

(b) Description of the Related Art

In a mobile wireless backhaul network for a high speed moving object that multi users gets into, the high speed moving object serves as a single terminal to transmit/receive data to/from a base station. Further, the high speed moving terminal serves data to user terminals inside the high speed moving object using technologies such as Wi-Fi and a femto cell. The method has an advantage of overcoming a propagation loss occurring while a radio wave received from an outside of the high speed moving object passes through the inside of the high speed moving object. Further, the high speed moving terminal at a cell boundary performs a group handover, and as a result a handover signaling burden on a lot of user terminals inside the high speed moving object that should each perform the handover may be reduced.

Typically, in the mobile wireless backhaul network for the high speed moving object, a line of sight (LOS) component of a signal appears to be larger than a non LOS (NLOS) component. Due to the feature, in the moving wireless backhaul network for the high speed moving object, it is difficult to obtain a rank of a channel between the base station and the high speed moving terminal, and therefore it is difficult to apply a multiple antenna (multiple input multiple output (MIMO)) technology.

Similar to the existing cellular network, in the moving wireless backhaul network for the high speed moving object, the base station becomes a reference and thus provides a synchronous signal and a pilot signal and the high speed moving terminal receives the signals to adapt to a frame boundary of the base station, thereby performing communications. Meanwhile, unlike the typical cellular network, in the moving wireless backhaul network for the high speed moving object, the high speed moving terminal on behalf of a plurality of user terminals transmits/receives data to/from the base station, and therefore the number of terminals directly transmitting/receiving data to/from each base station is very small and the number of terminals directly communicating with the base station may be one or may not be present. Therefore, continuously transmitting, by all the base stations, the synchronous signal, the pilot signal, the base station control information signal, etc., may cause power consumption.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an adaptive communication method and an adaptive communication apparatus capable of minimizing unnecessary power waste of a base station and a method of receiving a downlink signal of a high speed moving terminal capable of applying a multiple antenna technology, in a moving wireless backhaul network supporting a high speed moving object.

An exemplary embodiment of the present invention provides an adaptive communication method of a base station in a moving wireless backhaul network, including: acquiring frame transmitting/receiving timings of a terminal; periodically searching for a terminal synchronous signal transmitted from the terminal; if the terminal synchronous signal is detected, estimating the frame transmitting/receiving timings of the base station to/from the terminal based on the terminal synchronous signal and the frame transmitting/receiving timings of the terminal; and transmitting the base station synchronous signal to the terminal based on the frame transmitting/receiving timings of the base station.

Another embodiment of the present invention provides an adaptive communication method of a terminal in a moving wireless backhaul network, including: acquiring frame transmitting/receiving timings of the terminal; transmitting a terminal synchronous signal to a base station, matching the frame transmitting/receiving timings; searching for a base station synchronous signal transmitted from the base station in response to the terminal synchronous signal; if the base station synchronous signal is detected, acquiring a receiving timing from the base station based on the base station synchronous signal; generating timing correction information on the base station by comparing the frame transmitting/receiving timings of the terminal with the receiving timing; and transmitting the timing correction information to the base station.

Yet another embodiment of the present invention provides an adaptive communication apparatus in a moving wireless backhaul network including: a transceiver transmitting/receiving a signal to/from a terminal; a synchronous signal detector searching for the signal received through the transceiver to detect a terminal synchronous signal transmitted from the terminal; and a controller acquiring frame transmitting/receiving timings of the terminal from an external server, if the terminal synchronous signal is detected by the synchronous signal detector, estimates the frame transmitting/receiving timings of the adaptive communication apparatus to/from the terminal based on the terminal synchronous signal and the frame transmitting/receiving timings of the terminal, and controlling the transceiver to transmit a base station synchronous signal based on the frame transmitting/receiving timings of the adaptive communication apparatus.

Still another embodiment of the present invention provides a method of receiving a downlink signal of a high speed moving terminal in a moving wireless backhaul network, including: receiving synchronous signals from a base station through a plurality of antennas spaced apart from each other; acquiring receiving delay difference values among the plurality of antennas based on a receiving time of the synchronous signals of each antenna; acquiring delay correction values corresponding to each of the plurality of antennas based on the receiving delay difference values among the plurality of antennas; receiving downlink signals from the base station through the plurality of antennas; and delaying and correcting the downlink signals received through each of the antennas, based on the delay correction value.

According to an exemplary embodiment of the present invention, it is possible to minimize the unnecessary power consumption of the base station in the moving wireless backhaul network supporting the high speed moving object. Further, it is possible to improve the data rate in the moving wireless backhaul network by applying the multi-cell multiple antenna technology to the moving wireless backhaul network supporting the high speed moving object.

In addition, according to an exemplary embodiment of the present invention, it is possible to improve the data rate in the moving wireless backhaul network by applying the multiple antenna technology to the moving wireless backhaul network supporting the high speed moving object.

DETAILED DESCRIPTION OF THE EMBODIMENTS

Figure 1:
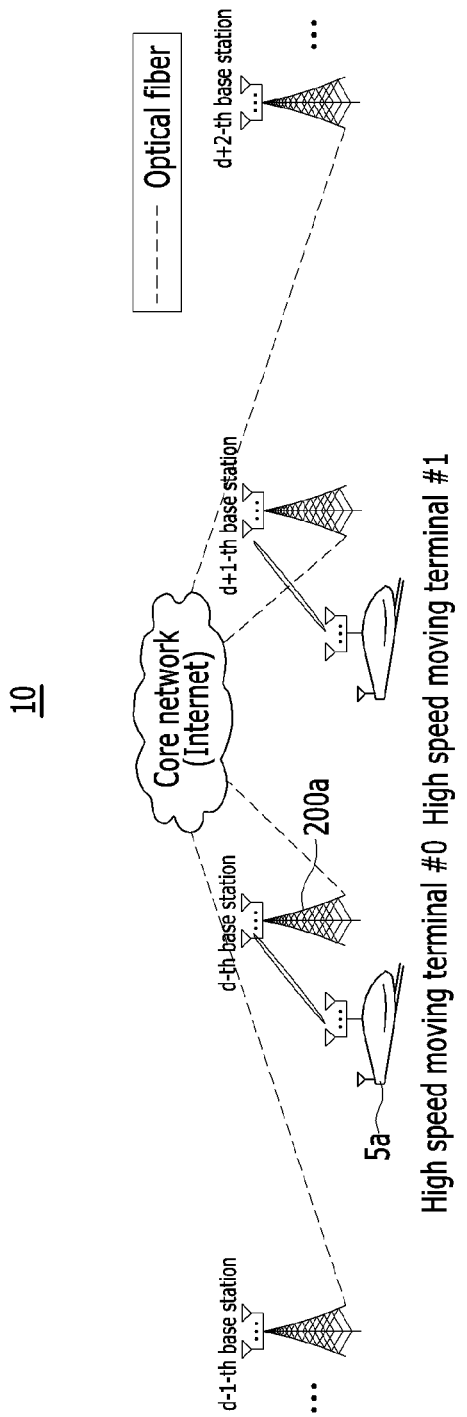
FIG. 1 is a diagram illustrating an example of a moving wireless backhaul network supporting a high speed moving object.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" any components will be understood to imply the inclusion of other elements rather than the exclusion of any other elements.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may also include all or some of the functions of the MT, the MS, the AMS, the HR-MS, the SS, the PSS, the AT, the UE, and the like Further, a base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (RS) serving as the base station, a high reliability relay station (HR-RS) serving as the base station, small base stations (a femto base station (femto BS), a home node B (HNB), a home eNodeB (HeNB), a pico base station (pico BS), a metro base station (metro BS), a micro base station (micro BS), and the like), a digital base station (digital unit, DU), an antenna base station (radio unit (RU)), and the like and may also include all or some of the functions of the ABS, the nodeB, the eNodeB, the AP, the RAS, the BTS, the MMR-BS, the RS, the RN, the ARS, the HR-RS, the small base stations, the DU, the RU, and the like.

FIG. 1 is a diagram illustrating an example of a moving wireless backhaul network supporting a high speed moving object.

The high speed moving object represents moving objects moving at a high speed, such as a train, a subway, a rapid transit railway, and a bus. Multi-users may get into the high speed moving object. The high speed moving object may include a communication terminal (hereinafter, referred to as 'high speed moving terminal') that is equipped in the high speed moving object.

Referring to FIG. 1, in a moving wireless backhaul network 10 supporting a high speed moving object 5a, the high speed moving terminal transmits/receives data to/and from base stations 200a on behalf of terminals (hereinafter, referred to as 'user terminal') of multi users getting into the high speed moving object 5a.

The high speed moving terminal may include at least one transmitting/receiving antenna installed at an outside of the high speed moving object 5a to transmit/receive the data to/from the base station 200a through a transmitting/receiving antenna.

The high speed moving terminal may be connected to at least one small cell or a Wi-Fi access point (AP), which is positioned inside the high speed moving object 5a, through a wired network inside the high speed moving object 5a. Therefore, the high speed moving terminal may transmit/receive data to the user terminals through the small cell or the Wi-Fi AP that is connected through the wired network.

The base station 200a is connected to a core network through an optical fiber, etc. Each of the base stations 200a may include at least one transmitting/receiving antenna and may transmit/receive the data to the high speed moving terminals through the transmitting/receiving antenna.

Figure 2:
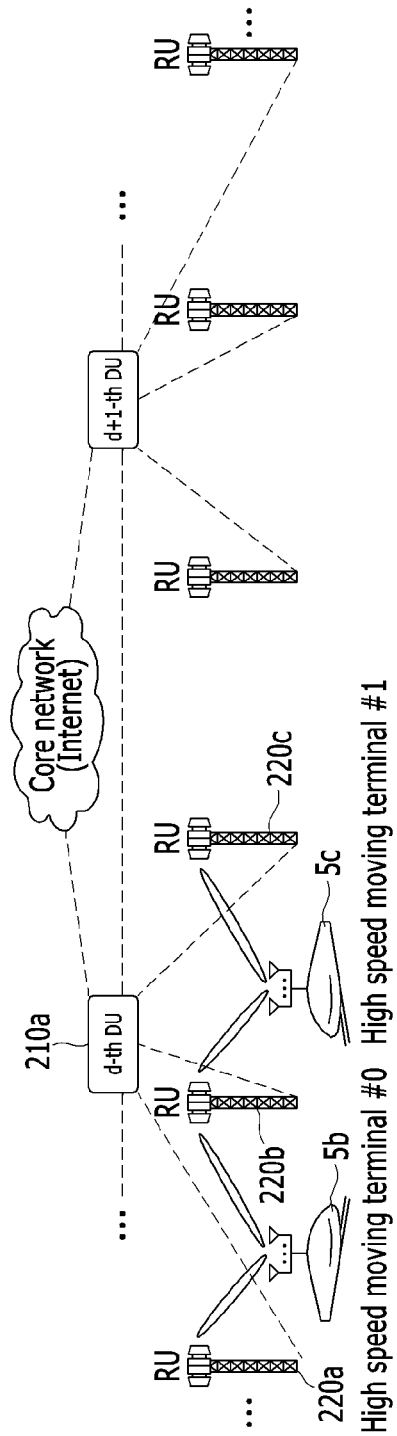
FIG. 2 is a diagram illustrating another example of a moving wireless backhaul network supporting a high speed moving object.

FIG. 2 illustrates another example of the moving wireless backhaul network supporting the high speed moving object and illustrates the moving wireless backhaul network to which a distributed antenna technology is applied.

Referring to FIG. 2, in the moving wireless backhaul network 20 to which the distributed antenna technology is applied, the base station is configured to include a digital base station (DU) 210a and antenna base stations (RUs) 220a, 220b, and 220c. The digital base station 210a performs a modem function of the base station. The digital base station 210a is connected to a plurality of antenna base stations 220a, 220b, and 220c.

The plurality of antenna base stations 220a, 220b, and 220c connected to one digital bas station 210a are distributed in the moving wireless backhaul network 20 to which the distributed antenna technology is applied. The digital base station 210a may transmit/receive the data to/from the high speed moving terminals through the distributed antenna base stations 220a, 220b, and 220c.

The moving wireless backhaul networks 10 and 20 for the high speed moving object require a very high data rate since a plurality of user terminals that are crowed inside high speed moving objects 5a, 5b, and 5c may simultaneously access the Internet. However, a frequency resource is excessively insufficient to implement the moving wireless backhaul technology for satisfying very high data transmission rate using the frequency bandwidth used in the currently constructed cellular network. For this reason, recently, a millimeter wave bandwidth has been interested as a next generation moving wireless backhaul frequency bandwidth.

A rapid transit railway which is being currently developed worldwide targets an operation at a speed of 400 km/h or more. Therefore, in the moving wireless backhaul networks 10 and 20 for the high speed moving object moving at a high speed like the rapid transit railway, an OFDM parameter needs to be determined in consideration of a Doppler frequency shift due to an operation speed of the high speed moving terminal.

When the OFDM parameter is determined in consideration of the a Doppler frequency shift due to the operation speed of the high speed moving terminal, a subcarrier spacing is very increased but the OFDM symbol and a cyclic prefix (CP) length is greatly reduced.

Therefore, in the case of a multiple antenna (multiple input multiple output (MIMO)) technology is applied to the moving wireless backhaul networks 10 and 20 for the high speed moving objects 5a, 5b, and 5c, when the spacing between the transmitting/receiving antennas installed at the outside of the high speed moving objects 5a, 5b, and 5c is wide, there may be a problem in that the signals received through the transmitting/receiving antennas of the high speed moving terminal do not enter one CP section. Further, to solve the problem, a technology of narrowing the spacing between the transmitting/receiving antennas at the outside of the high speed moving object is used. However, by the technology, there is a problem in that it is difficult to obtain a rank of a channel between the base station and the high speed moving terminal and thus it is difficult to use the multiple antenna technology. In particular, when the millimeter wave frequency bandwidth is applied to the moving wireless backhaul networks 10 and 20, the frequency bandwidth is higher than a general cellular bandwidth and thus the subcarrier spacing is more increased and the length of the CP is more reduced, such that the problem is getting serious.

To solve the problem, the high speed moving terminal according to the exemplary embodiment of the present invention appropriately delays the signals received through each of the transmitting/receiving antennas to compensate for a signal delay.

Hereinafter, referring to FIGS. 3 to 5, a high speed moving terminal and a method of receiving a downlink signal of a high speed moving terminal in a moving wireless backhaul network according to the exemplary embodiment of the present invention will be described in detail.

Figure 3:
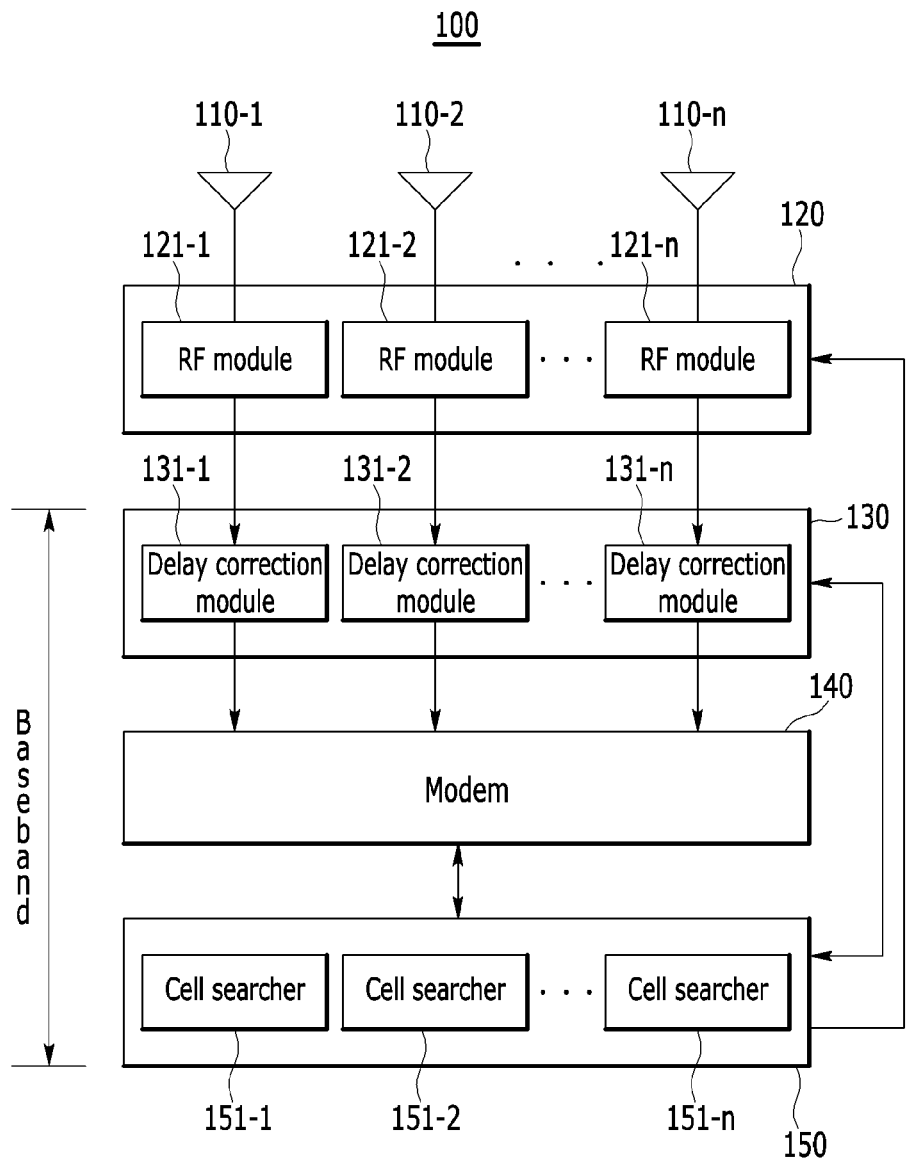
FIG. 3 is a configuration diagram schematically illustrating a high speed moving terminal in the moving wireless backhaul network according to the exemplary embodiment of the present invention.

FIG. 3 is a configuration diagram schematically illustrating a high speed moving terminal in the moving wireless backhaul network according to the exemplary embodiment of the present invention. FIG. 4 is a diagram for describing a method of selecting a reference antenna of a high speed moving terminal according to an exemplary embodiment of the present invention.

Referring to FIG. 3, a high speed moving terminal 100 according to an exemplary embodiment of the present invention may include a plurality of antennas 110-1, 110-2, . . . , 110-n, a transceiver 120, a delay controller 130, a modem 140, a terminal controller 150, etc.

The plurality of antennas 110-1, 110-2, . . . , 110-n is disposed at the outside of the high speed moving object while being spaced apart from each other. The plurality of antennas 110-1, 110-2, . . . , 110-n transmits/receives data to/from the base station of the moving wireless backhaul network.

The transceiver 120 converts the downlink signal received from the base station through the plurality of antennas 110-1, 110-2, . . . , 110-n into a baseband signal.

The transceiver 120 may include a plurality of radio frequency (RF) modules 121-1, 121-2, . . . , 121-n. Each of the RF modules 121-1, 121-2, . . . , 121-n is connected to different antennas 110-1, 110-2, . . . , 110-n. Each of the RF modules 121-1, 121-2, . . . , 121-n converts the downlink signals received through the corresponding antennas 1110-1, 110-2, . . . , 110-n into the baseband signal. The downlink signal converted into the baseband by the transceiver 120 is transmitted to the delay controller 130 for delay correction.

The delay controller 130 may perform the delay correction on the downlink signal transmitted from the transceiver 120 based on delay correction values each corresponding to the plurality of antennas 110-1, 110-2, . . . , 110-n. The delay correction values of each of the antennas 110-1, 110-2, . . . , 110-n may be received from the terminal controller 150 to be described below.

The delay controller 130 may include a plurality of delay correction modules 131-1, 131-2, . . . , 131-n). Each of the delay correction modules 131-1, 131-2, . . . , 131-n are connected to different RF modules 121-1, 121-2, . . . , 121-n and receives the downlink signals received from the corresponding RF modules 121-1, 121-2, . . . , 121-n through each of the antennas 110-1, 110-2, . . . , 110-n. When receiving the downlink signals converted into the baseband from the corresponding RF modules 121-1, 121-2, . . . , 121-n, each of the delay correction modules 131-1, 131-2, . . . , 131-n uses a buffer (not illustrated) to buffer the downlink signals as much as the corresponding delay correction value, to thereby correct the downlink signals. The downlink signals whose delay is corrected by each of the delay correction modules 131-1, 131-2, . . . , 131-n) is output to the modem 140.

When receiving the downlink signals whose delay is corrected by the delay controller 130, the modem 140 transmits demodulated and decoded data to a small cell or a Wi-Fi AP through a wired network inside the high speed moving object. The terminal controller 150 controls the overall operation of the high speed moving terminal 100.

When power is supplied to the high speed moving terminal 100, the terminal controller 150 communicates with the base station through each of the antennas 110-1, 110-2, . . . , 110-n to perform an initial synchronization process. During the initial synchronization process of the terminal controller 150 with the base station, the terminal controller 150 may acquire the delay correction values corresponding to each of the antennas 110-1, 110-2, . . . , 110-n based on the delay difference in the synchronization signals received from the base station to each of the antennas 110-1, 110-2, . . . , 110-n.

Hereinafter, a method of acquiring, by a terminal controller 150, delay correction values corresponding to each of the antennas 110-1, 110-2, . . . , 110-n will be described in detail.

The terminal controller 150 receives the synchronous signals from the base station through each of the antennas 110-1, 110-2, . . . , 110-n during the initial synchronization process. During the initial synchronization process, the synchronous signals received through each of the antennas 110-1, 110-2, . . . , 110-n are transmitted to the terminal controller 150 through the transceiver. During the initial synchronization process, the synchronous signals are transmitted to the terminal controller 150 without being delayed. For example, the synchronous signals may be transmitted from the transceiver 120 to the terminal controller 150 without passing through the delay controller 130. Further, for example, the synchronous signals may pass through each of the delay correction modules 131-1, 131-2, . . . , 131-n in the state in which the delay correction values of each of the delay correction modules 131-1, 131-2, . . . , 131-n are 0 even though the synchronous signals pass through the delay controller 130 and then may pass through the terminal controller 150. In the latter case, the delay correction values corresponding to each of the delay correction modules 131-1, 131-2, . . . , 131-n may be initialized to 0 while the high speed moving terminal 100 is initialized by being supplied with power.

The terminal controller 150 compares the synchronous signals received from the base station to each of the antennas 110-1, 110-2, . . . , 110-n with each other to acquire a difference (hereinafter, referred to as 'delay difference value') in delayed degrees among the synchronous signals received from the base station to each of the antennas 110-1, 110-2, and 110-3.

The terminal controller 150 may include a plurality of cell searcher 151-1, 151-2, . . . , 151-n. The plurality of cell searchers 151-1, 151-2, . . . , 151-n each receive the signals received through different antennas 110-1, 110-2, . . . , 110-n. When receiving the signals received from the base station through each of the antennas 110-1, 110-2, . . . , 110-n, the cell searchers 151-1, 151-2, . . . , 151-n detect frame sections and frame boundaries where the frame sections start in the received input signal in the cell search process. The frame boundary corresponds to a start position of the frame section in the time domain.

When the plurality of cell searchers 151-1, 151-2, . . . , 151-n detect the frame boundaries using the synchronous signals received through each of the antennas 110-1, 110-2, . . . , 110-n, the terminal controller 150 may calculate the delay difference values among the plurality of antennas 110-1, 110-2, . . . , 110-n based on the detected frame boundaries.

The terminal controller 150 selects any one of the plurality of antennas 110-1, 110-2, . . . , 110-n as a reference antenna to calculate the delay difference values among the plurality of antennas 110-1, 110-2, . . . , 110-n.

The terminal controller 150 may select an antenna having the largest receiving delay of the signals received from the base station among the plurality of antennas 110-1, 110-2, . . . 110-n as the reference antenna. For example, referring to FIG. 4, the terminal controller 150 may select a first antenna having the largest delay time taken to receive downlink frames frame #0, frame #1, . . . from the base station as the reference antenna.

When the reference antenna is selected, the terminal controller 150 may acquire the delay difference values for each of the rest antennas based on the difference value between the receiving delay of the reference antenna and the receiving delays of the rest antennas. The difference value between the receiving delay of the reference antenna and the receiving delays of the rest antennas may be derived from a position difference between the frame boundary detected from the synchronous signal received through the reference antenna and the frame boundaries detected from the synchronous signals received through the rest antennas in the time domain.

Figure 4:
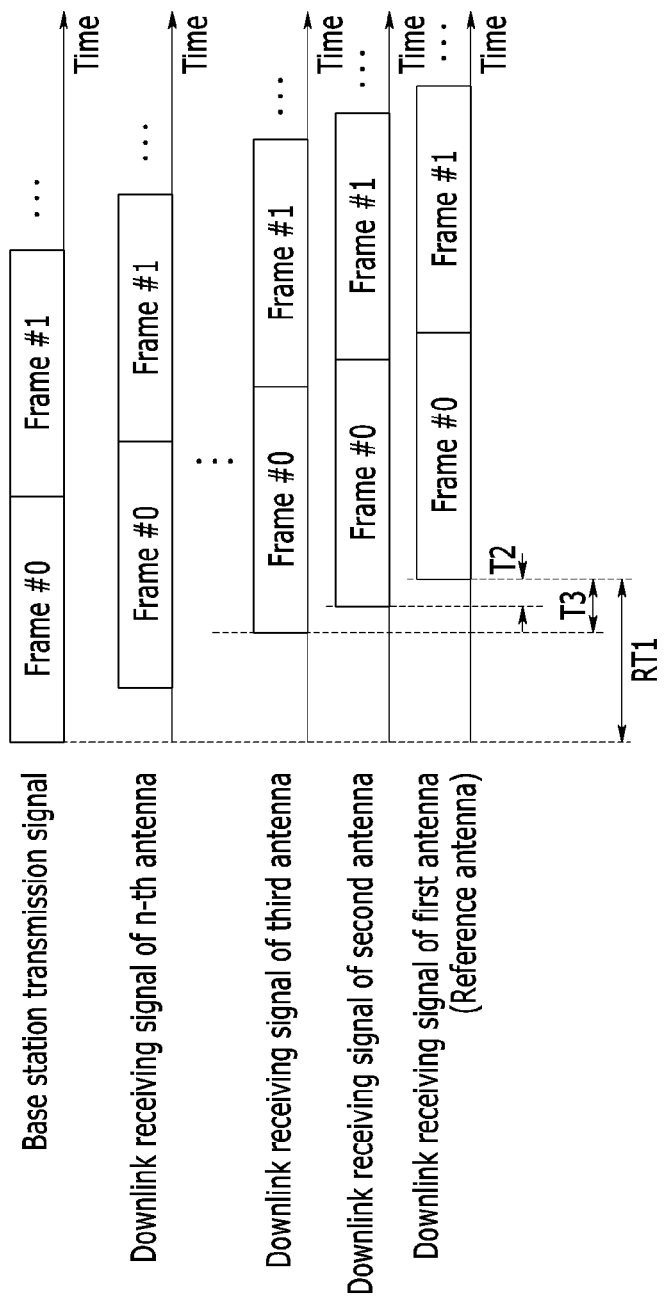
FIG. 4 is a diagram for describing a method of selecting a reference antenna of a high speed moving terminal according to an exemplary embodiment of the present invention.

For example, referring to FIG. 4, when the first antenna is set as the reference antenna, the terminal controller 150 may calculate a difference value T2 between time taken for the first antenna to receive the same frame #0 based on the frame boundaries corresponding to each of the antennas and time taken for the second antenna to receive the same frame #0 and determine the difference value T2 as the delay difference value corresponding to the second antenna. Further, the terminal controller 150 may calculate a difference value T3 between time taken for the first antenna to receive the same frame #0 and time taken for a third antenna to receive the same frame #0 based on the frame boundaries corresponding to each of the antennas and may acquire the difference value T3 as the delay difference value corresponding to the third antenna. The first antenna itself is the reference antenna and therefore the delay difference value becomes 0.

When the delay difference values corresponding to each of the antennas 110-1, 110-2, . . . , 110-n are calculated, the terminal controller 150 acquires the delay correction values for correcting the delay difference values for each of the antennas 110-1, 110-2, . . . , 110-n. For example, referring to FIG. 4, when the delay difference value of the second antenna for the reference antenna (first antenna) is T2, the delay correction value for correcting the receiving delay difference of the second antenna for the reference antenna may also be T2.

When the delay correction values corresponding to each of the antennas 110-1, 110-2, . . . , 110-n are calculated, the terminal controller 150 transmits the delay correction values to the delay correction modules 131-1, 131-2, . . . , 131-n corresponding to each of the antennas 110-1, 110-2, . . . , 110-n to be used for the delay correction of the downlink signals received through each of the antennas 110-1, 110-2, . . . , 110-n.

As described above, when the delay correction values for each of the antennas 110-1, 110-2, . . . , 110-n are determined, the terminal controller 150 transmits the delay correction values to each of the delay correction modules 131-1, 131-2, . . . , 131-n.

When receiving the delay correction values from the terminal controller 150, each of the delay correction modules 131-1, 131-2, . . . , 131-n delays the downlink signals received through each of the antennas 110-1, 110-2, . . . , 110-n during the communication with the base station based on the received delay correction values to synchronize the frame boundaries between the downlink signals received through the plurality of antennas 110-1, 110-2, ..., 110-n.

Therefore, OFDM symbols of all the downlink signals transmitted to the modem 140 through each of the delay correction modules 131-1, 131-2, ..., 131-n may be synchronized and thus the multiple antenna technology may be applied to the high speed moving terminal 100, thereby improving the data rate in the moving wireless backhaul network.

The terminal controller 150 may acquire the delay correction values corresponding to each of the antennas 110-1, 110-2, ..., 110-n during the initial synchronization process and then may periodically update the delay correction values. When the update period arrives, the terminal controller 150 re-performs the same process as the process of acquiring the delay correction values initially, thereby updating the delay correction values corresponding to each of the antennas 110-1, 110-2, ..., 110-n. The update period of the delay correction values may be short or long depending on the moving speed of the high speed moving object in which the high speed moving terminal 100 is installed and the interval among the plurality of antennas 110-1, 110-2, ..., 110-n. For example, the faster the moving speed of vehicles, the shorter the update period of the delay correction values.

Meanwhile, according to the foregoing exemplary embodiment of the present invention, the case in which the delay correction process for correcting the delay difference values among the plurality of antennas 110-1, 110-2, ..., 110-n is performed only by the delay correction modules 131-1, 131-2, ..., 131-n is described as an example, but the exemplary embodiment of the present invention is not limited thereto.

When the delay difference values among the plurality of antennas 110-1, 110-2, ..., 110-n are large, the buffering time for correcting the delay difference values is long and thus the buffer size is increased. Therefore, when the delay correction is performed only by the delay correction modules 131-1, 131-2, ..., 131-n, there is a problem in that the burden of the delay correction modules 131-1, 131-2, ..., 131-n may be increased. To solve the problem, the high speed moving terminal 100 may also divide the delay correction process for correcting the delay difference values among the plurality of antennas 110-1, 110-2, ..., 110-n into several steps. For example, the RF module 121-1, 121-2, ..., 121-n stages additionally perform the delay correction process and thus the RF module 121-1, 121-2, ..., 121-n stages perform a first-stage delay correction process and then the delay correction modules 131-1, 131-2, ..., 131-n may also perform a second-stage delay correction process.

In this case, the terminal controller 150 divides the delay correction value corresponding to each of the antennas 110-1, 110-2, ..., 110-n into a delay correction value T_RF at the RF modules 121-1, 121-2, ..., 121-n and a delay correction value T_BB at the delay correction modules 131-1, 131-2, ..., 131-n to calculate the delay correction value. Further, the calculated delay correction values T_RF and T_BB are each transmitted to the corresponding RF modules 121-1, 121-2, ..., 121-n and delay correction modules 131-1, 131-2, ..., 131-n to perform the two-stage delay correction process.

For example, referring to FIG. 4, the delay correction value of the second antenna for the reference antenna may be calculated by being divided into a T2_RF that is the delay correction value at the RF module 121-2 and a T2_BB that is the delay correction value at the delay correction module 131-2. In this case, a sum of the T2_RF and the T2_BB corresponds to the T2 that is the delay difference value of the second antenna and the T2_BB may be calculated in consideration of the buffer size of the delay correction module 131-2.

Figure 5:
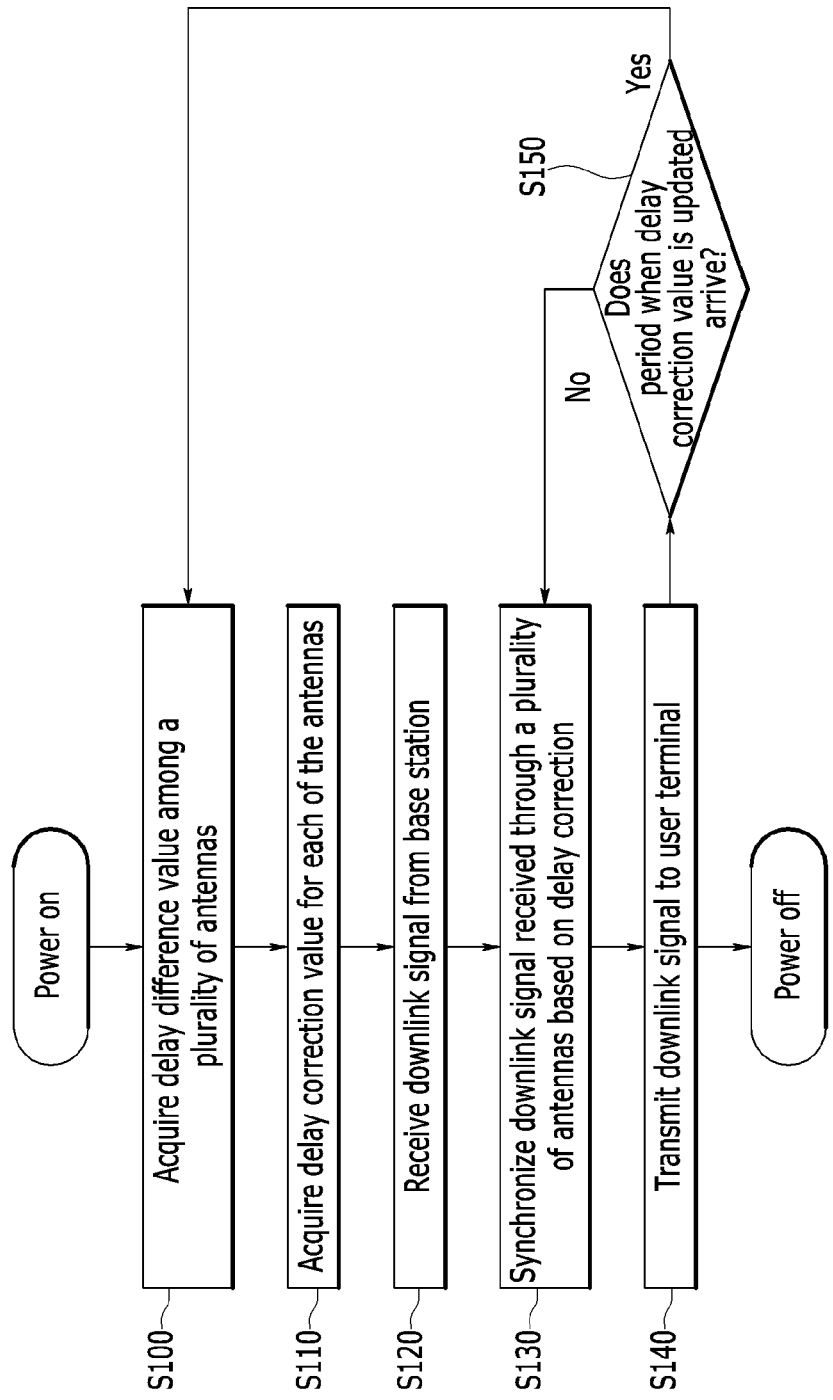
FIG. 5 is a diagram schematically illustrating a method of receiving a downlink signal of a high speed moving terminal in a moving wireless backhaul network according to an exemplary embodiment of the present invention.

FIG. 5 is a diagram schematically illustrating a method of receiving a downlink signal of a high speed moving terminal according to an exemplary embodiment of the present invention.

Referring to FIG. 5, the high speed moving terminal 100 according to the exemplary embodiment of the present invention acquires the delay difference values among the plurality of antennas 110-1, 110-2, ..., 110-n for the delay correction (S100).

In the step S100, the high speed moving terminal 100 may acquire the delay difference values among the plurality of antennas 110-1, 110-2, ..., 110-n during the initial synchronization process with the base station. That is, the high speed moving terminal 100 may compare the delayed degrees among the synchronous signals received from the base station to each of the antennas 110-1, 110-2, ..., 110-n during the initial synchronization process to acquire the delay difference values among the plurality of antennas 110-1, 110-2, ..., 110-n. The high speed moving terminal 100 may select the antenna having the largest receiving delay of the synchronous signal received from the base station among the plurality of antennas 110-1, 110-2, ..., 110-n as a reference antenna and compare the synchronous signal receiving delays of the rest antennas based on the synchronous signal receiving delay of the reference antenna with each other to acquire the delay difference values for each of the rest antennas.

When the delay difference values among the plurality of antennas 110-1, 110-2, ..., 110-n are acquired in the step S100, the high speed moving terminal 100 calculates the delay correction values for each of the antennas 110-1, 110-2, ..., 110-n based on the acquired delay difference values (S110).

In the step S110, the high speed moving terminal 100 may correct the delay difference values among the plurality of antennas 110-1, 110-2, ..., 110-n to calculate the delay correction values of each of the antennas 110-1, 110-2, ..., 110-n, to thereby synchronize the frame boundaries among the downlink signals received through the plurality of antennas 110-1, 110-2, ..., 110-n.

In the step S110, the high speed moving terminal 100 may calculate only one of the delay correction values for each of the antennas 110-1, 110-2, ..., 110-n depending on into how many stages the delay correction is divided and may also divide the delay correction values for each of the antennas 110-1, 110-2, ..., 110-n into each stage to calculate the delay correction values.

Next, when the downlink signals are received from the base station (S120), the high speed moving terminal 100 performs the delay correction on the downlink signals received through each of the antennas 110-1, 110-2, ..., 110-n based on the delay correction values calculated for each of the antennas 110-1, 110-2, ..., 110-n. Therefore, the downlink signals received through each of the antennas 110-1, 110-2, ..., 110-n are transmitted to the modem 140 in the state in which the frame boundaries are synchronized by the delay correction (S130).

When the delay-corrected downlink signals are input, the modem 140 transmits the downlink signals to the user terminal through the small cell or the Wi-Fi AP (S140). That is, the modem 140 performs the demodulation and the decoding on the delay-corrected downlink signals and transmits the data to the small cell base station or the Wi-Fi AP inside the high speed moving object through the wired network inside the high speed moving object, and the small cell or the Wi-Fi AP again transmits the data to the user terminal.

Meanwhile, the delay correction values of each of the antennas 110-1, 110-2, . . . , 110-n may periodically be updated.

When the update period of the delay correction value arrives (S150), the high speed moving terminal 100 recalculates the delay correction values for each of the antennas 110-1, 110-2, . . . , 110-n in the steps S100 and S110. Here, the update period of the delay correction values may be adaptively changed depending on the moving speed of the high speed moving object in which the high speed moving terminal 100 is installed and the interval among the plurality of antennas 110-1, 110-2, . . . , 110-n.

According to the foregoing exemplary embodiment of the present invention, when the downlink signals are received from the base station through the plurality of antennas 110-1, 110-2, . . . , 110-n, the high speed moving terminal 100 corrects the receiving delays of the downlink signals based on one of the plurality of antennas 110-1, 110-2, . . . , 110-n prior to transmitting the downlink signals to the modem 140 to synchronize the frame boundaries. Therefore, OFDM symbols of all the downlink signals transmitted to the modem 140 maybe synchronized and therefore the multiple antenna technology may be applied to the high speed moving terminal 100, thereby improving the data rate in the moving wireless backhaul network.

Meanwhile, in the moving wireless backhaul networks 10 and 20 for the high speed moving objects 5a, 5b, and 5c, unlike the general cellular network, the high speed moving terminal on behalf of the plurality of user terminals transmits/receives data to/from the base station 200a (or antenna base stations 220a, 220b, and 220c). Therefore, the number of terminals directly transmitting/receiving data to/from the base station 200a (or antenna base stations 220a, 220b, and 220c) is very small and the case in which the number of terminals directly communicating with the base station 200a (or antenna base stations 220a, 220b, and 220c) is only one or is not present is frequently generated.

Therefore, continuously transmitting, by all the base stations (or antenna base station), the synchronous signal, the pilot signal, the base station control information signals, and the like causes the unnecessary power consumption to cause the power waste.

Meanwhile, as described above, when the OFDM parameter is determined in consideration of the a Doppler frequency shift due to the operation speed of the high speed moving terminal, a subcarrier spacing is very increased but the OFDM symbol and a cyclic prefix (CP) length is greatly reduced.

Therefore, if the interval between the base stations (or antenna base station) is not sufficiently close to each other, the signals received from the two base stations (or antenna base station) may not enter one CP section, and thus the high speed moving terminal may hardly use the multi-cell multiple antenna (multi-cell MIMO) technology. In particular, when the millimeter wave frequency bandwidth is applied to the moving wireless backhaul networks 10 and 20, the frequency bandwidth is higher than a general cellular bandwidth and thus the subcarrier spacing is more increased and the length of the CP is more reduced, such that the problem is getting serious.

To solve the above problems, according to another exemplary embodiment of the present invention, the high speed moving terminal is a reference of communication and thus transmits the synchronous signal to the base station and the base station is adapted thereto to perform the communication.

Hereinafter, an adaptive communication method and an adaptive communication apparatus in a moving wireless backhaul network according to another exemplary embodiment of the present invention will be described in detail with reference to FIGS. 6 to 11.

Figure 6:
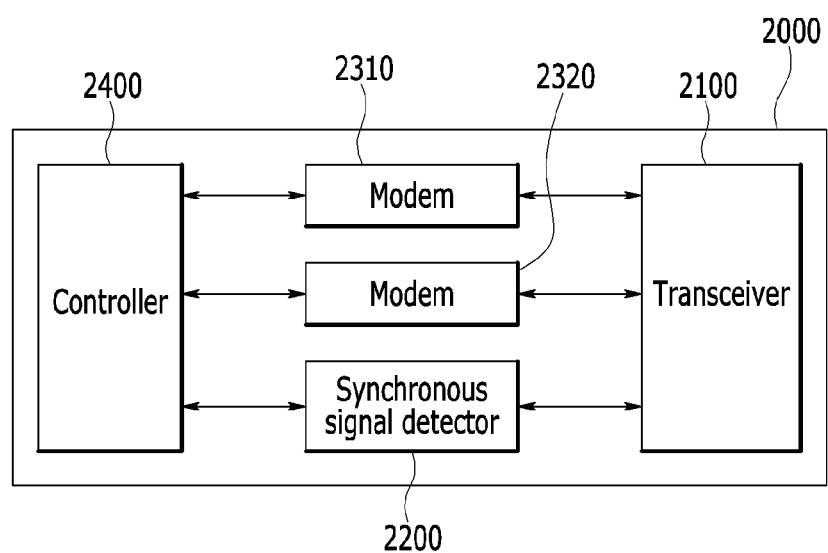
FIG. 6 is a diagram schematically illustrating an adaptive communication apparatus in a moving wireless backhaul network according to another exemplary embodiment of the present invention.
Figure 7:
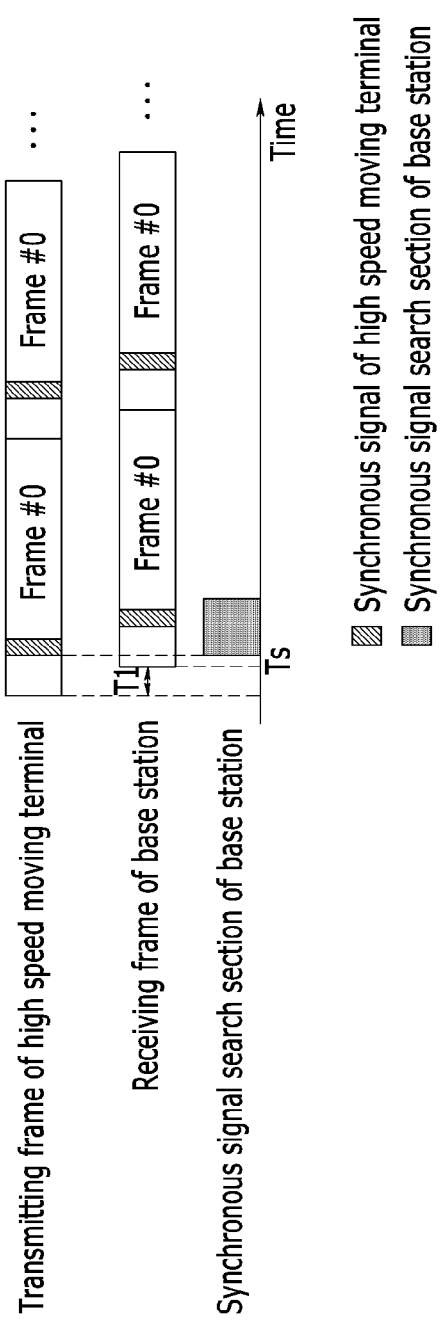
FIG. 7 is a diagram illustrating an example in which a synchronous signal search section in the adaptive communication apparatus according to another exemplary embodiment of the present invention is set.
Figure 8:
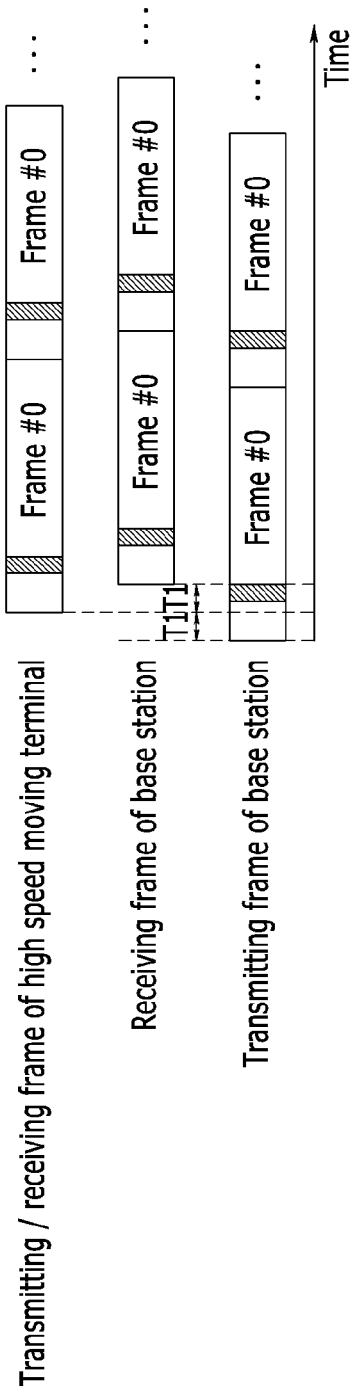
FIG. 8 is a diagram illustrating an example in which transmitting/receiving timings in the adaptive communication apparatus according to another exemplary embodiment of the present invention are estimated.

FIG. 6 is a diagram schematically illustrating an adaptive communication apparatus in a moving wireless backhaul network according to another exemplary embodiment of the present invention. FIG. 7 is a diagram illustrating an example in which a synchronous signal search section in the adaptive communication apparatus according to another exemplary embodiment of the present invention is set. FIG. 8 is a diagram illustrating an example in which transmitting/receiving timings in the adaptive communication apparatus according to another exemplary embodiment of the present invention are estimated.

Referring to FIG. 6, an adaptive communication apparatus 2000 according to another exemplary embodiment of the present invention may include a transceiver 2100, a synchronous signal detector 2200, modems 2310 and 2320, and a controller 2400. The adaptive communication apparatus 2000 may be implemented within the base station in the moving wireless backhaul network supporting the high speed moving object. For example, referring to FIG. 1, the adaptive communication apparatus 2000 may be implemented within the base station 200a in the moving wireless backhaul network 10. Further, for example, referring to FIG. 2, each component of the adaptive communication apparatus 2000 may also be implemented within the digital base station 210a or the antenna base stations 220a, 220b, and 220c in the moving wireless backhaul network 20.

The transceiver 2100 operates the plurality of beams independent from each other depending on the control signal of the controller 2400 and transmits/receives a signal to/from the high speed moving terminal through this operation.

The synchronous signal detector 2200 searches for the signal received through the transceiver 2100 to detect the synchronous signal (hereinafter, referred to as 'terminal synchronous signal') transmitted from the high speed moving terminal. To reduce power consumption by minimizing the processing, the synchronous signal detector 2200 may perform the terminal synchronous signal search periodically only during the predetermined section (hereinafter, referred to as 'synchronous signal search section) instead of continuously searching for the terminal synchronous signal.

The synchronous signal detector 2200 compares the synchronous signal received through the transceiver 2100 with a preset signal threshold during the synchronous signal search section to detect the terminal synchronous signal transmitted from the high speed moving terminal.

The synchronous signal detector 2200 may also detect a beam having the largest received signal strength of the terminal synchronous signal among a plurality of beams operated in the transceiver 2100 upon the detection of the terminal synchronous signal.

The modems 2310 and 2320 serves to modulate or demodulate the signal transmitted/received between the adaptive communication apparatus 2000 and the high speed moving terminal in a baseband stage.

Meanwhile, FIG. 6 illustrates, for example, the case in which the adaptive communication apparatus 2000 includes two modems 2310 and 2320, but the present invention is not limited thereto. The number of modems included in the adaptive communication apparatus 2000 may correspond to the maximum number of high speed moving terminals with which the adaptive communication apparatus 2000 needs to simultaneously communicate. For example, in the moving wireless backhaul network included in the rapid transit railway operated bi-directionally, the maximum number of high speed moving terminals with which the adaptive communication apparatus 2000 needs to simultaneously communicate is 2 and therefore the adaptive communication apparatus 200 may include two modems.

The controller 2400 controls the overall operation of the adaptive communication apparatus 2000.

The controller 2400 may serve an interface function with an upper layer. The controller 2400 may receive, from the upper layer, the data to be transmitted to each of the high speed moving terminals through the interface with the upper layer or transfer the data received from each of the high speed moving terminals to the upper layer.

The controller 2400 may set the synchronous signal search section of the synchronous signal detector 2200.

In the moving wireless backhaul networks 10 and 20 supporting the high speed moving object, the transmitting/receiving timings, that is, the transmitting/receiving frame boundaries of the high speed moving terminals may be synchronized by a synchronous server (not illustrated) such as a global positioning system (GPS), or the like. The frame boundary corresponds to a start position (or start timing) and an end position (or end point) of the frame in the time domain.

When the transmitting/receiving frame boundaries of the high speed moving terminals are synchronized by the synchronous server, the controller 2400 may receive the transmitting/receiving timing information of the high speed moving terminals from the synchronous server and acquire the transmitting/receiving frame boundaries and the synchronous signal transmitting timings of the high speed moving terminals based the received transmitting/receiving timing information. Further, the synchronous signal search section may be set based on the synchronous signal transmitting timing of the high speed moving terminals.

Referring to FIG. 7, due to the propagation delay depending on a distance between the base station and the high speed moving terminal, a delay corresponding to the time T1 occurs until the frame transmitted by the high speed moving terminal is received by the actual base station. Therefore, the controller 2400 may set the synchronous signal search section in consideration of the maximum radius of the cell supported by the base station of the adaptive communication apparatus 2000 (or antenna base station), based on a synchronous signal transmitting timing Ts of the high speed moving terminal acquired from the synchronous server.

Normally, as the distance between the high speed moving terminal and the base station is increased, the timing when the terminal synchronous signal transmitted by the high speed moving terminal is received by the base station is delayed. Therefore, the controller 2400 may predict a maximum delay time until the terminal synchronous signal transmitted by the high speed moving terminal is received by the base station, based on the maximum radius of the cell supported by the corresponding base station (or antenna base station). When the maximum delay time is predicted, the controller 2400 may set the synchronous signal search section, including a section as much as the maximum delay time from the timing when the high speed moving terminal transmits the terminal synchronous signal.

Meanwhile, another exemplary embodiment of the present invention describes, for example, the case in which the controller 2400 sets the synchronous signal search section of the synchronous signal detector 2200, but is not limited thereto. Therefore, the synchronous signal search section of the synchronous signal detector 2200 may also be set by the synchronous signal detector 2200. In this case, the controller 2400 may transmit the transmitting/receiving timing information of the high speed moving terminals acquired from the synchronous server to the synchronous signal detector 2200 so that the synchronous signal detector 2200 may set the synchronous signal search section.

The controller 2400 may control whether the adaptive communication apparatus 2000 is activated.

When there is no high speed moving terminal which is communicating with the adaptive communication apparatus 2000, the controller 2400 controls the adaptive communication apparatus 2000 to be in a deactivated state. That is, the controller 2400 stops the transmission of the synchronous signal, the pilot signal, the control information signal, or the like of the transceiver.

When the terminal synchronous signal is detected by the synchronous signal detector 2200 in the state in which the adaptive communication apparatus 2000 is in the deactivated state, the controller 2400 controls the adaptive communication apparatus 2000 to be in an activated state.

Meanwhile, even though the controller 2400 switches the adaptive communication apparatus 2000 to the deactivated state, the synchronous signal detector 2200 is periodically switched to the activated state to perform the operation of detecting the terminal synchronous signal during the predetermined synchronous signal search section.

If the synchronous signal detector 2200 detects the terminal synchronous signal, the controller 2400 may estimate the transmitting/receiving timings of the adaptive communication apparatus 2000 based on the detected terminal synchronous signal.

When the synchronous signal detector 2200 detects the terminal synchronous signal, the controller 2400 controls the adaptive communication apparatus 2000 to acquire the frame boundaries of the frame received from the high speed moving terminal based on the detected terminal synchronous signal. Further, the adaptive communication apparatus 2000 compares the frame boundary of the actually received frame with the frame boundary of the transmitting frame of the high speed moving terminal to calculate the propagation delay time between the high speed moving terminal and the adaptive communication apparatus 2000, that is, the propagation delay time until the frame transmitted from the high speed moving terminal is received by the adaptation communication apparatus 2000. The frame boundary of the transmitting frame of the high speed moving terminal may be predicted from the transmitting/receiving timings of the high speed moving terminals received from the synchronous server.

When the propagation delay time between the high speed moving terminal and the adaptive communication apparatus 2000 is calculated, the controller 2400 estimates the transmitting/receiving timings of the adaptive communication apparatus 2000 based on the calculated propagation delay time.

For example, referring to FIG. 8, when the propagation delay time estimated from the terminal synchronous signal is T1, the controller 2400 performs a control to set the receiving timing (or receiving frame boundary) of the adaptive communication apparatus 2000 to be delayed as much as T1 compared to the transmitting timing (or transmitting frame boundary) of the high speed moving terminal. Further, the controller 2400 performs a control to set the transmitting timing (or transmitting frame boundary) of the adaptive communication apparatus 2000 to be led as much as T1 compared to the receiving timing (or receiving frame boundary) of the high speed moving terminal and to be led twice as much as T1 compared to the receiving timing (or receiving frame boundary) of the adaptive communication apparatus 2000.

When the transmitting/receiving timings to and from the high speed moving terminal are estimated, the controller 2400 may control the transceiver 2100 to transmit the synchronous signal (hereinafter, referred to as 'base station synchronous signal') to the high speed moving terminal depending on the estimated transmitting timing.

The high speed moving terminal receiving the synchronous signal acquires the frame boundary of the frame received from the base station based on the base station synchronous signal. Further, the timing correction information is calculated by comparing the acquired receiving frame boundary with the preset receiving frame boundary based on the base station synchronous signal. Further, the calculated timing correction information is fed back to the adaptive communication apparatus 2000.

When the timing correction information is received from the high speed moving terminal, the controller 2400 corrects the error of the transmitting/receiving timings to and from the high speed moving terminal based on the received timing correction information and performs communication with the high speed moving terminal based on the error-corrected transmitting/receiving timing.

Meanwhile, in the moving wireless backhaul networks 10 and 20 supporting the high speed moving object, the case in which one base station (or antenna base station) communicates with at least two high speed moving terminals may occur. For example, referring to FIG. 2, one antenna base station 220b communicates with the high speed moving terminals of two high speed moving objects 5b and 5c.

As such, in the situation that the antenna base station needs to simultaneously communicate with at least two high speed moving terminals, when the high speed moving terminals to be in a communication state are positioned at different places, distances between the adaptive communication apparatus 2000 and each of the high speed moving terminals may be different from each other. Therefore, even though the transmitting/receiving timings of the high speed moving terminals are synchronized with each other by the synchronous server, the timings when the adaptive communication apparatus 2000 receives the terminal synchronous signals from each of the high speed moving terminals may be different from each other. In the viewpoint of the adaptive communication apparatus 2000, when the timings when the adaptive communication apparatus 2000 receives the synchronous signals from each of the high speed moving terminals may be different from each other, the transmitting/receiving timings to and from each of the high speed moving terminals estimated based on the terminal synchronous signal are also different.

To simultaneously communicate with the plurality of high speed moving terminals having different transmitting/receiving timings, adaptive communication apparatus 2000 operates the plurality of beams independent from each other. That is, the adaptive communication apparatus 2000 is connected to different modems 2310 and 2320 and independently operates the plurality of beams that may be set as different transmitting/receiving timings and thus may support the plurality of high speed moving terminals in which the transmitting/receiving timings to/from the adaptive communication apparatus 2000 are different due to the position.

The adaptive communication apparatus 2000 selects the beam most suitable for each of the high speed moving terminals among the plurality of beams that are being operated to perform communication with each of the high speed moving terminals.

The controller 2400 may allocate one of the plurality of beams to each of the high speed moving terminal based on the terminal synchronous signals received from each of the high speed moving terminals.

The controller 2400 acquires the information on the beam having the largest received signal strength of the terminal synchronous signal among the plurality of beams operated in the transceiver 2100 during the detection of the terminal synchronous signal transmitted from the high speed moving terminal through the synchronous signal detector 2200. Further, the beam having the largest received signal strength of the terminal synchronous signal among the plurality of beams is allocated to the corresponding high speed moving terminal.

When one of the plurality of beams is allocated to the high speed moving terminal, the controller 2400 controls the transceiver 2100 to communicate with the high speed moving terminal through the corresponding beam. Therefore, the transceiver 2100 transmits the base station synchronous signal, the pilot signal, the base station control information signal, or the like to each of the high speed moving terminals using the beam allocated to each of the high speed moving terminals.

In the adaptive communication apparatus 2000 having the foregoing structure, the functions of the transceiver 2100, the synchronous signal detector 2200, the modem 2300, and the controller 2400 may be performed by a processor that is implemented as at least one central processing unit (CPU) or other chipsets, a microprocessor, etc.

Figure 9:
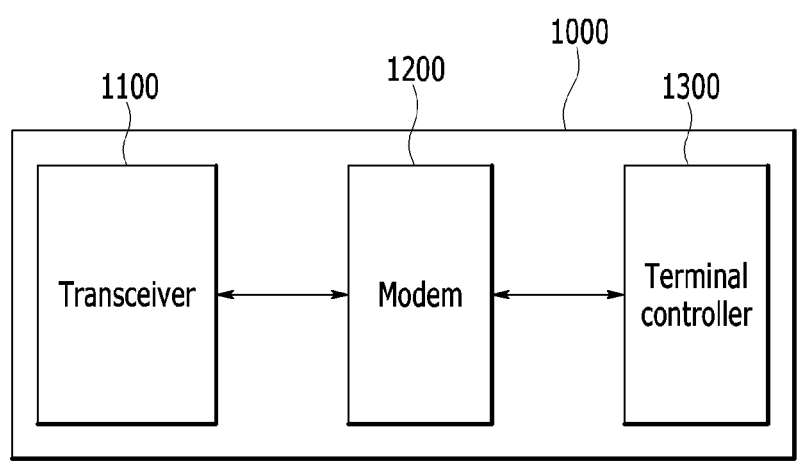
FIG. 9 is a diagram schematically illustrating a high speed moving terminal according to another exemplary embodiment of the present invention.

FIG. 9 is a diagram schematically illustrating a high speed moving terminal according to another exemplary embodiment of the present invention.

Referring to FIG. 9, a high speed moving terminal 1000 according to another exemplary embodiment of the present invention may include a transceiver 1100, a modem 1200, and a terminal controller 1300.

The transceiver 1100 transmits/receives a signal to and from the base station depending on the control signal of the terminal controller 1300.

The modem 1200 serves to modulate or demodulate the signals transmitted/received between the high speed moving terminal 1000 and the base station in the baseband stage. For example, when receiving the signal from the base station through the transceiver 1100, the modem 1200 demodulates and decodes the received signal and then transmits the demodulated and decoded data to the small cell or the Wi-Fi AP through the wired network inside the high speed moving object. The terminal controller 1300 controls the overall operation of the high speed moving terminal 1000.

When power is supplied to the high speed moving terminal 1000, the terminal controller 1300 receives the transmitting/receiving timing information from the synchronous server (not illustrated). Further, the controller 1300 may control the transceiver 1100 to communicate with the base station based on the received transmitting/receiving timing information. For example, the terminal controller 1300 controls the transceiver 1100 to periodically transmit the terminal synchronous signal to the base station based on the transmitting timing information.

When the base station synchronous signal is received from the base station in response to the terminal synchronous signal, the terminal controller 1300 acquires the frame boundary of the frame actually received from the base station based on the received base station synchronous signal. Further, the timing correction information may be calculated by comparing the frame boundary of the receiving frame received from the base station with the preset receiving frame boundary of the high speed moving terminal 1000. The receiving frame boundary of the high speed moving terminal 1000 may be obtained from the transmitting/receiving timing information received from the synchronous server.

When the timing correction information is calculated, the terminal controller 1300 controls the transceiver 1100 and the modem 1200 to feed back the calculated timing correction information to the base station.

Meanwhile, when the high speed moving terminal 1000 transmits the terminal synchronous signal to the base station to request communication, the situation that the received signal strength of the terminal synchronous signal received by the base station does not exceed the signal threshold set by the base station may occur due to the distance from the base station, the surrounding environment, etc.

Upon the transmission of the terminal synchronous signal, the terminal controller 1300 may control the transceiver 1100 or the modem 1200 to stepwise amplify the transmitted signal strength of the terminal synchronous signal until the base station synchronous signal is received from the base station to transmit the terminal synchronous signal. In this case, an amplification gain, an amplification step, an amplification method, etc., of the terminal synchronous signal may be designed based on frequency bandwidth characteristics, cell coverage, etc., of the moving wireless backhaul networks 10 and 20 included in the high speed moving terminal 1000.

Figure 10:
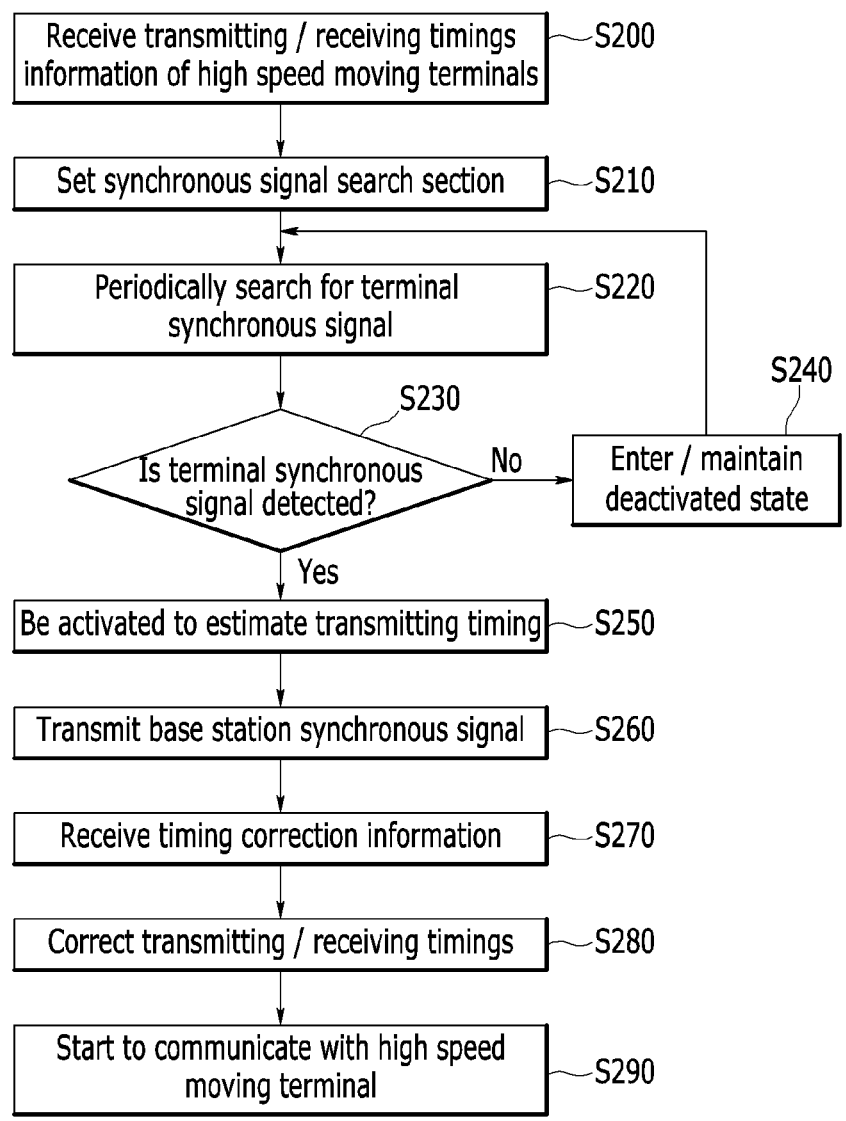
FIG. 10 is a diagram schematically illustrating an adaptive communication method of a base station in a moving wireless backhaul network according to another exemplary embodiment of the present invention.

FIG. 10 is a diagram schematically illustrating an adaptive communication method of a base station in a moving wireless backhaul network according to another exemplary embodiment of the present invention. In FIG. 10, the adaptive communication method in the base station may be performed by the adaptive communication apparatus 2000 described with reference to FIG. 6.

Referring to FIG. 10, the adaptive communication apparatus 2000 according to another exemplary embodiment of the present invention receives the transmitting/receiving timing information of the high speed moving terminals from the synchronous server (S200).

When the transmitting/receiving timing information of the high speed moving terminals is received from the synchronous server, the adaptive communication apparatus 2000 sets the synchronous signal search section based on the received transmitting/receiving timing information (S210).

The synchronous signal search section is a section for searching for the terminal synchronous signal transmitted from the high speed moving terminals in the adaptive communication apparatus 2000. To minimize power consumption due to the processing by the synchronous signal search process, the adaptive communication apparatus 2000 periodically searches for the terminal synchronous signal during the synchronous signal search section, instead of continuously searching for the terminal synchronous signal.

In the step S210, the adaptive communication apparatus 2000 may acquire the terminal synchronous signal transmitting timings of the high speed moving terminals from the transmitting/receiving timing information of the high speed moving terminals received from the synchronous server and set the synchronous signal search section based on the acquired terminal synchronous signal transmitting timings. That is, the adaptive communication apparatus 2000 may set the synchronous signal search section in consideration of the maximum radius of the cell supported by the base station (or antenna base station) corresponding to the adaptive communication apparatus 2000, based on the synchronous signal transmitting timing of the high speed moving terminal.

The adaptive communication apparatus 2000 periodically searches for the terminal synchronous signal received from the high speed moving terminal, based on the predetermined synchronous signal search section in the step S210 (S220). In the step S220, the adaptive communication apparatus 2000 periodically searches for the terminal synchronous signals of the high speed moving terminals, in connection with the period where the high speed moving terminals transmit the synchronous signal.

The adaptive communication apparatus 2000 compares the signals received through the transceiver 2100 with a preset signal threshold during the synchronous signal search section to determine whether the terminal synchronous signal transmitted from the high speed moving terminal is detected (S230).

When the terminal synchronous signal is not detected within the synchronous signal search section, the adaptive communication apparatus 2000 stops the signal transmission such as the base station synchronous signal, the pilot signal, and the base station control information signal and enters the deactivated state or maintains the deactivated state (S240).

On the other hand, when the terminal synchronous signal transmitted from the high speed moving terminal is detected within the synchronous signal search section, the adaptive communication apparatus 2000 is switched to the activated state. Further, the transmitting timing (or transmitting frame boundary) of the adaptive communication apparatus 2000 is estimated based on the detected terminal synchronous signal (S250).

In the step S250, when the terminal synchronous signal is detected, the adaptive communication apparatus 2000 acquires the frame boundary of the frame received from the high speed moving terminal based on the detected terminal synchronous signal. When the frame boundary of the receiving frame received from the high speed moving terminal is acquired, the adaptive communication apparatus 2000 compares the acquired frame boundary with the frame boundaries of the transmitting frames of the high speed moving terminals to calculate the propagation delay time between the adaptive communication apparatus 2000 and the high speed moving terminal and estimate the transmitting timing of the transmitting frame of the adaptive communication apparatus 2000, that is, the frame boundary of the transmitting frame based on the calculated propagation delay time. The frame boundary of the transmitting frame of the high speed moving terminal may be acquired from the transmitting/receiving timings of the high speed moving terminals received from the synchronous server in the step S200.

When the transmitting timing is estimated in the step S250, the adaptive communication apparatus 200 transmits the base station synchronous signal to the high speed moving terminal based on the estimated timing (S260). Further, the timing correction information is received from the high speed moving terminal receiving the base station synchronous signal (S270).

The high speed moving terminal receiving the base station synchronous signal from the adaptive communication apparatus 2000 acquires the frame boundary of the frame received from the base station based on the received base station synchronous signal. Further, the timing correction information is calculated by comparing the frame boundary of the frame received from the base station with the preset receiving frame boundary.

The adaptive communication apparatus 2000 fed back with the timing correction information from the high speed moving terminal corrects its own transmitting/receiving timing (or the frame boundary of the transmitting/receiving frame) based on the received timing correction information (S280). The communication with the high speed moving terminal starts based on the correction transmitting/receiving timing (S290).

In the step S290, when the timing correction is completed, the adaptive communication apparatus 2000 informs the high speed moving terminal that the communication may be available and transmits the base station system information (or control information) to the high speed moving terminal to start communication with the high speed moving terminal.

Figure 11:
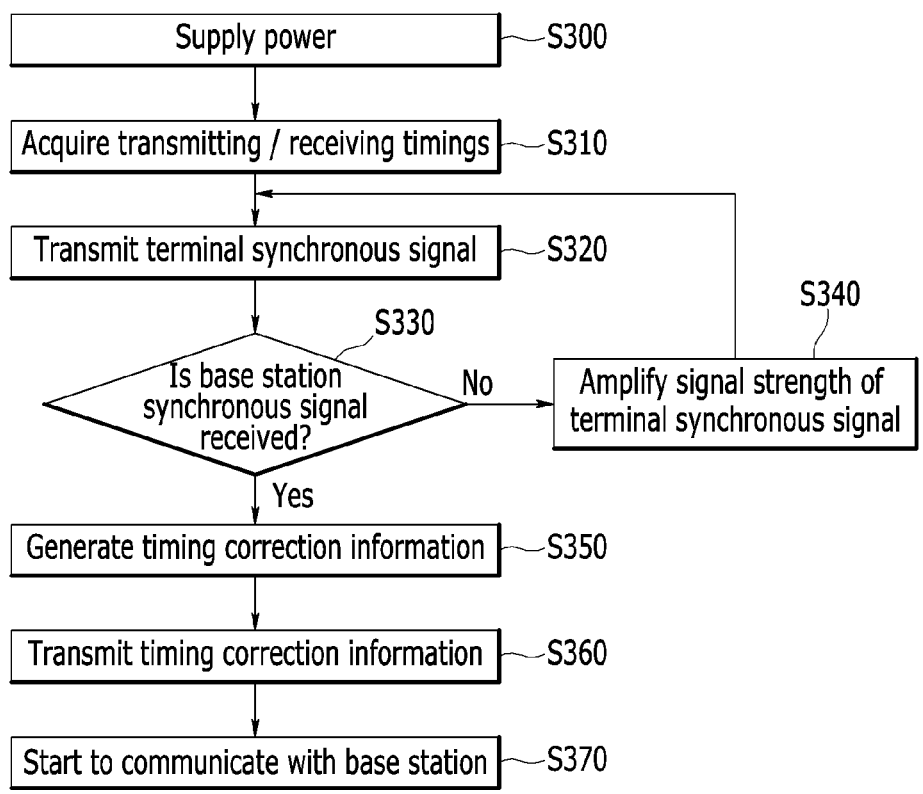
FIG. 11 is a diagram schematically illustrating an adaptive communication method of a terminal in a moving wireless backhaul network according to another exemplary embodiment of the present invention.

FIG. 11 is a diagram schematically illustrating an adaptive communication method of a terminal in a moving wireless backhaul network according to another exemplary embodiment of the present invention. The adaptive communication method in FIG. 11 may be performed by the high speed moving terminal 1000 described with reference to FIG. 11.

Referring to FIG. 11, the high speed moving terminal 1000 according to another exemplary embodiment of the present invention is supplied with power (S300) and thus acquires its own transmitting/receiving timing information from the synchronous server (S310).

The high speed moving terminal 1000 transmits the terminal synchronous signal based on transmitting/receiving timing information from the synchronous server to request communication with base station (S320).

The high speed moving terminal 1000 transmits the terminal synchronous signal and then waits for the reception of the base station synchronous signal responding to the terminal synchronous signal for a predetermined time (S330).

When the base station synchronous signal is not received from the base station for a predetermined time (for example, time until the transmitting timing of the next terminal synchronous signal), the high speed moving terminal 1000 determines that the synchronous signal transmission fails. Therefore, the high speed moving terminal 1000 amplifies the transmitting signal strength of the terminal synchronous signal (S340) to retransmit the terminal synchronous signal.

When the high speed moving terminal 1000 transmits the terminal synchronous signal to the base station to request communication, the situation that the signal strength of the terminal synchronous signal received by the base station does not exceed the signal threshold set by the base station may occur due to the distance from the base station, the surrounding environment, etc.

Therefore, the high speed moving terminal 1000 stepwise amplifies the signal strength of the terminal synchronous signal and repeats the transmission, until the base station synchronous signal is received from the base station. In this case, an amplification gain, an amplification step, an amplification method, etc., of the terminal synchronous signal may be designed based on frequency bandwidth characteristics, cell coverage, etc., of the moving wireless backhaul networks 10 and 20 included in the high speed moving terminal 1000.

When the base station synchronous signal is received from the base station, the high speed moving terminal 1000 calculates the transmitting/receiving timing error of the base station based on the received base station synchronous signal and generates the timing correction information for correcting the timing error (S350). Further, the generated timing correction information is transmitted to the base station (S360).

In the step S350, the high speed moving terminal 1000 acquires the frame boundary of the frame actually received from the base station based on the base station synchronous signal received from the base station. Further, the timing error may be calculated by comparing the frame boundary of the receiving frame received from the base station with the preset receiving frame boundary of the high speed moving terminal 1000 and the timing correction information for correcting the calculated timing error may be generated.

When the transmitting/receiving timing of the base station is corrected based on the fed back timing correction information, the high speed moving terminal 1000 starts communication with the base station (S370).

In the step S370, when the timing correction in the base station is completed, the high speed moving terminal 1000 may receive the system information (or control information) of the base station from the base station and perform communication with the base station based on the received system information.

According to another exemplary embodiment of the present invention as described above, in the moving wireless backhaul network supporting the high speed moving object, the high speed moving terminal becomes the reference of the communication to transmit the synchronous signal to the base station, and thus the base station adapts to the synchronous signal to perform communication. Therefore, only when the high speed moving terminal is present within the coverage of the base station, the base station may transmit the synchronous signal, the base station control information, etc., and when the high speed moving terminal is not present within the coverage of the base station, the base station may maintain the deactivated state, thereby remarkably reducing the power waste due to the periodic transmission of the synchronous signal, the base station control information, etc.

Further, the base station adapts its own transmitting/receiving timing, matching the transmitting/receiving timings of each of the highs speed moving terminals, and as a result the base station easily perform the cooperative communication with the multiple base station. Therefore, when the millimeter wave bandwidth is applied to the moving wireless backhaul network, the disadvantage that it is difficult to implement the multi-cell multiple antenna may be overcome by the cooperative communication to apply the millimeter wave frequency bandwidth to the moving wireless backhaul network, thereby remarkably improving the data transmission rate.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An adaptive communication method of a base station in a moving wireless backhaul network, comprising:
   acquiring frame transmitting/receiving timings of a terminal;
   periodically searching for a terminal synchronous signal transmitted from the terminal; and
   if the terminal synchronous signal is detected, adapting a frame transmitting/receiving timings of the base station with respect to the terminal in accordance with the frame transmitting/receiving timings of the terminal based on the terminal synchronous signal,
   wherein the adapting the frame transmitting/receiving timings of the base station includes:
   estimating the frame receiving timing of the base station with respect to the terminal based on the terminal synchronous signal;
   calculating a propagation delay time between the terminal and the base station by comparing the frame transmitting/receiving timings of the terminal with the frame receiving timing of the base station; and
   estimating the frame transmitting timing of the base station with respect to the terminal based on the propagation delay time.

2. The adaptive communication method of claim 1, wherein:
   the adapting the frame transmitting/receiving timings of the base station further includes:
   transmitting a base station synchronous signal to the terminal based on the frame transmitting/receiving timings of the base station;
   receiving timing correction information from the terminal receiving the base station synchronous signal; and
   correcting the transmitting/receiving timings of the base station based on the timing correction information.

3. The adaptive communication method of claim 1, further comprising:
   setting a synchronous signal search section for searching for the terminal synchronous signal based on the frame transmitting/receiving timings of the terminal.

4. The adaptive communication method of claim 1, further comprising:
   if there is no terminal communicating with the base station, entering a deactivated state in which the transmission of the base station synchronous signal stops.

5. The adaptive communication method of claim 4, further comprising:
   if the terminal synchronous signal is detected, switching to an activated state.

6. The adaptive communication method of claim 1, wherein:
   the acquiring of the frame transmitting/receiving timings of the terminal further includes:
   receiving the frame transmitting/receiving timings of the terminal from an external synchronous server.

7. The adaptive communication method of claim 1, further comprising:
   allocating one of a plurality of beams independently operated to the terminal,
   wherein the transmitting of the base station synchronous signal to the terminal is transmitting the base station synchronous signal to the terminal using the beam allocated to the terminal.

8. The adaptive communication method of claim 7, wherein:
   the allocating of one of the plurality of beams to the terminal includes allocating a beam having strongest received signal strength of the terminal synchronous signal among the plurality of beams to the terminal.

9. An adaptive communication method of a base station in a moving wireless backhaul network, comprising:
   acquiring frame transmitting/receiving timings of a terminal;
   setting a synchronous signal search section for searching for a terminal synchronous signal based on the frame transmitting/receiving timings of the terminal;
   periodically searching for the terminal synchronous signal transmitted from the terminal; and
   if the terminal synchronous signal is detected, adapting a frame transmitting/receiving timings of the base station with respect to the terminal in accordance with the frame transmitting/receiving timings of the terminal based on the terminal synchronous signal,
   wherein the setting of the synchronous signal search section includes:
   acquiring a synchronous signal transmitting timing of the terminal from the frame transmitting/receiving timings of the terminal; and
   setting the synchronous signal search section in consideration of a maximum radius of a cell supported by the base station and the acquired synchronous signal transmitting timing.

10. A method of receiving a downlink signal of a high speed moving terminal in a moving wireless backhaul network, comprising:
    receiving synchronous signals from a base station through a plurality of antennas spaced apart from each other;
    acquiring receiving delay difference values among the plurality of antennas based on a receiving time of the synchronous signals of each antenna;
    acquiring delay correction values corresponding to each of the plurality of antennas based on the receiving delay difference values among the plurality of antennas;
    receiving downlink signals from the base station through the plurality of antennas; and
    delaying and correcting the downlink signals received through each of the antennas, based on the delay correction values,
    wherein the acquiring of the receiving delay difference value includes:
    selecting one of the plurality of antennas as a reference antenna; and
    calculating the receiving delay difference values among the plurality of antennas by comparing the receiving delay of the reference antenna with those of the rest antennas.

11. The method of claim 10, further comprising:
    detecting frame boundaries from the synchronous signals received from each of the antennas,
    wherein the receiving delays of each antenna is calculated based on the frame boundaries corresponding to each of the antennas.

12. The method of claim 10, wherein:
    the selecting of the reference antenna is
    selecting an antenna having a largest receiving delay among the plurality of antennas as the reference antenna.

13. The method of claim 10, further comprising:
    re-performing the receiving of the synchronous signal, the acquiring of the receiving delay difference value, and the acquiring of the delay correction value at a predetermined period to update the delay correction value.

14. The method of claim 13, wherein:
the period varies depending on a moving speed of a high speed moving object with which the high speed moving terminal is equipped.

\* \* \* \* \*